J. RATCLIFFE.
TURN TABLE FOR STONE POLISHING AND OTHER PURPOSES.
APPLICATION FILED SEPT. 15, 1910.
983,517.
Patented Feb. 7, 1911.
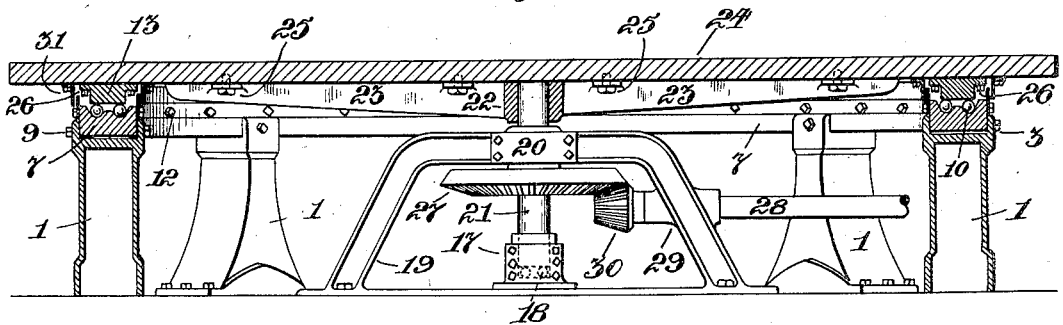
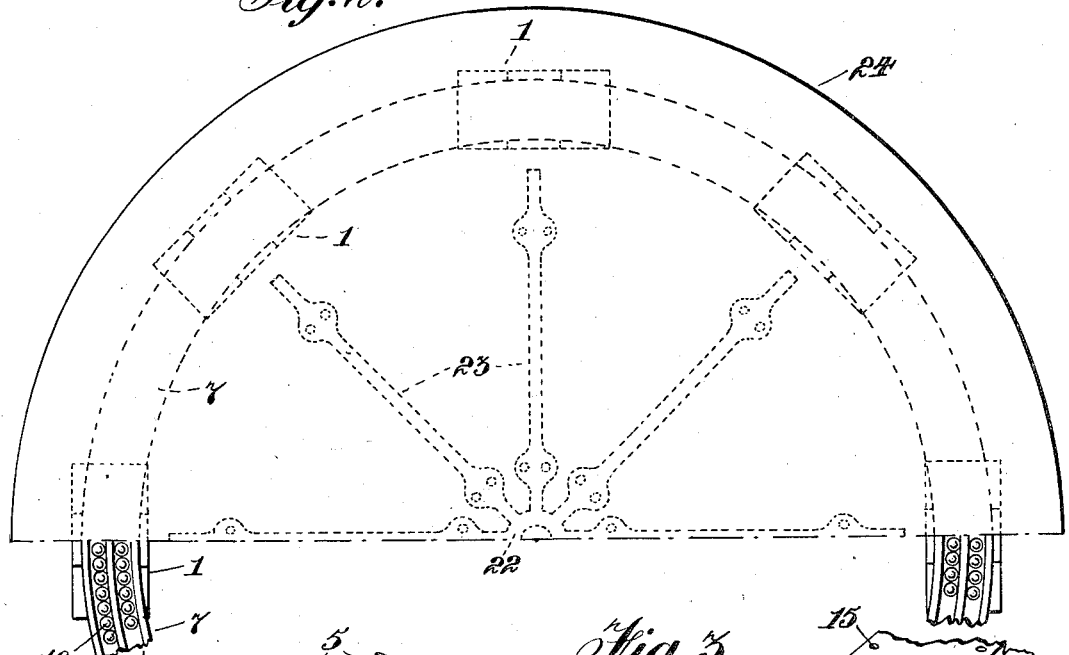
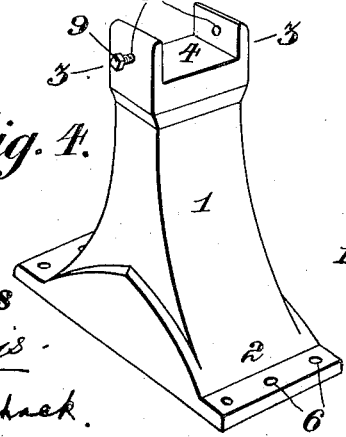
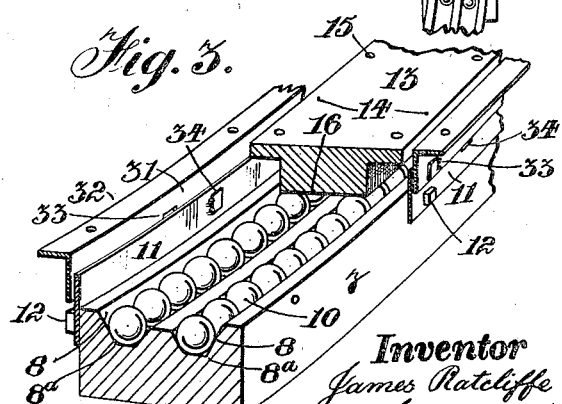
Witnesses
H. Davis
B. A. Rumback
Inventor
James Ratcliffe
by
E. J. Featherstonhaugh
Atty

UNITED STATES PATENT OFFICE.

JAMES RATCLIFFE, OF WINNIPEG, MANITOBA, CANADA.

TURN-TABLE FOR STONE-POLISHING AND OTHER PURPOSES.

983,517.  Specification of Letters Patent.  Patented Feb. 7, 1911.

Application filed September 15, 1910. Serial No. 582,229.

*To all whom it may concern:*

Be it known that I, JAMES RATCLIFFE, a subject of the King of Great Britain, and resident of 977 Winnipeg avenue, in the city of Winnipeg, Province of Manitoba, Dominion of Canada, stone-cutter, have invented certain new and useful Improvements in Turn-Tables for Stone-Polishing and other Purposes, of which the following is a specification.

The invention relates to improvements in a turn table for stone polishing and other purposes, as described in the present specification and illustrated in the accompanying drawings that form part of the same.

The invention consists essentially of the novel construction and arrangement of parts, whereby the bearings for the table or rubbing bed insure freedom of movement.

The objects of the invention are to devise a turn table form of stone polishing machine, which shall be operated at a minimum expenditure of power and generally to provide a structure simple cheap and durable as to its parts and capable of broad application as to its uses.

In the drawings, Figure 1 is a vertical mid-sectional view of the machine. Fig. 2 is a plan view of one half the table showing the supports in dotted lines and broken away parts of the races and balls in solid lines. Fig. 3 is an enlarged perspective detail of a portion of a ball race and balls. Fig. 4 is an enlarged perspective detail of a standard.

Like numerals of reference indicate corresponding parts in each figure.

Referring to the drawings, 1 are the standards tapering toward their upper ends from the bases 2 and having at the upper ends the vertical flanges 3 forming the squared recesses 4, said flanges 3 having screw holes 5 therethrough and said bases having the bolt holes 6 therethrough. 7 is a ring preferably formed of one casting and squared on its lower side and fitting into the recesses 4 and supported by said standards 1 and having the continuous grooves 8 in the upper side forming ball races, formed with the angles 8ª. 9 are set screws inserted in the screw holes 5 securing said rings 7 firmly to the standards 1.

10 are balls forming bearings and running in the races 8. 11 is a dust guard ring secured to the outer and inner sides of the ring 7 by the screws 12 and extending above said ring 7. 13 is a supporting ring having the flanges 14 and the screw holes 15 therethrough and the bearing surface 16 traveling on said balls 10.

17 is a cup bearing having the ball bearings 18 in the bottom thereof and centrally arranged in relation to the ring 7.

19 is a frame supporting the bearing 20 in vertical alinement with the cup bearing 17.

21 is a vertical shaft journaled at its lower end in the cup bearing 17 and intermediate of its height in the bearing 20.

22 is the body of a spider fixedly mounted at the upper end of the shaft 21.

23 are the legs of the spider extending radially from the body 22.

24 is a table or rubbing bed rigidly secured to the spider legs 23 by the screws 25 and to the supporting ring 13 by the screws 26.

It will be thus seen that the table or rubbing bed 24 is supported centrally and toward its outer edge on ball bearings and therefore will run very freely and smoothly with comparatively small power.

27 is a bevel gear wheel fixedly mounted on the shaft 21 within the frame 19.

28 is a driven shaft journaled in the bearings 29 supported from the frame 19.

30 is a bevel pinion fixedly mounted on the end of the shaft 28 and coacting with the gear wheel 27.

In the operation of this machine, the shaft 28 is suitably driven and the pinion 30 coacting with the gear pin 27 rotates the shaft 21 and consequently the spider secured to the table 24. The said table will thus be turned, causing the ring 13 to travel on the balls 10 thereby revolving said table with great ease so that it may be utilized as a rubbing bed for polishing stone or for any other purpose to which a turn table may be applied.

The dust, especially in stone polishing, is directed from the bearings by the guards 31 extending downwardly from the table 24 outside and beyond the upper end of the ring 11, said guard 31 being secured to the table 24 by suitable screws through the flange 32.

It must be understood that without departing from the spirit of my invention, modifications may be made in regard to the various parts in the construction of machines for the various purposes to which they may be applied, so long as the elements, as set forth in any one of the following claims for novelty, remain.

The doors 33 and 34 are shown in the said dust guards 31 and 11 respectively for oiling purposes.

The machine is stopped to lubricate the bearings, the said doors 33 and 34 being brought in alinement.

The supporting ring 13 may be a downward facial projection from the underside of the table instead of separate therefrom. Further, ball races of similar formation to the races 8 may be formed in the bearing surface 16, in fact several changes in the construction of the grooves and placing can be made without affecting the main object of the invention.

What I claim as my invention is:

1. In a turn table for stone polishing and other purposes, in combination, a table, a spider rigidly secured to the underside of said table, a shaft extending downwardly from said spider, means for driving said shaft, a plurality of standards having rectangular recesses at their upper ends, a ring rigidly secured to the underside of said table adjacent to the edge thereof said ring having downwardly extending central portion forming a plate bearing on its under side, a ring of rectangular formation and fitting in said standards and having a plurality of grooves side by side forming ball races, the bed of each of said grooves being of angular formation, and balls in said races.

2. In a turn table for stone polishing and other purposes, in combination, a table, a spider rigidly secured to the underside of said table, a shaft extending downwardly from said spider, means for driving said shaft, a plurality of standards having rectangular recesses at their upper ends, a ring rigidly secured to the underside of said table adjacent to the edge thereof said ring having downwardly extending central portion forming a plate bearing on its under side, a ring of rectangular formation and fitting in said standards and having a plurality of grooves side by side forming ball races, the bed of each of said grooves being of angular formation, a pair of plates in ring form rigidly secured to the outer and inner side respectively of the ball race ring and extending upwardly therefrom forming one part of a dust guard, and a pair of plates in ring form having right angular flanges at their upper ends rigidly secured to the under side of said table and extending downwardly therefrom beyond the upper end of the aforesaid dust guard and adjacent thereto.

3. In a device of the class described, in combination, a plurality of standards, a ring supported by said standards having ball races therein arranged, balls in said races, a ring plate bearing secured to the under side of said table bearing on said balls, a spider having a suitable hub and secured to the underside of said table, a shaft radially secured in the hub of said spider extending downwardly therefrom, an open frame centrally arranged under said table and standing on a suitable base and having at the upper end thereof a central bearing for the aforesaid shaft, a cup bearing for the aforesaid shaft centrally arranged on said base, a bevel gear mounted on said shaft within said frame, a horizontal bearing supported from one of the sides of said frame, a shaft journaled in said bearing, a bevel pinion mounted at the end of said shaft and engaging said bevel gear, and means for driving said bevel gear shaft.

Signed at the city of Winnipeg, Province of Manitoba, Dominion of Canada, this 31st day of August 1910.

JAMES RATCLIFFE.

Witnesses:
R. I. STRAITH,
WILLIAM H. COLLUM.